Patented May 4, 1937

2,079,404

UNITED STATES PATENT OFFICE 2,079,404

CATALYST PREPARATION

Charles Roberts Harris, Niagara Falls, N. Y., assignor to E. I. du Pont de Nemours & Company, Wilmington, Del., a corporation of Delaware No Drawing. Application September 19, 1934, Serial No. 744,711

11 Claims. (Cl. 23—233)

This invention relates to the preparation of catalytic materials, and more particularly to the preparation of catalysts which contain one or more of the platinum metals as active catalytic ingredients.

The platinum metals, that is platinum, palladium, rhodium, osmium, iridium and ruthenium, as well as alloys of these metals, are well-known as active catalysts for a great variety of chemical reactions, both organic and inorganic. For example, these metals are catalysts for chemical reactions involving oxidation, hydrogenation and decomposition. In such reactions, they facilitate the desired chemical process and often determine the predominant course of the reaction. These metals or their alloys also are efficient catalysts for reacting nitrogenous compounds with carbonaceous materials to produce hydrocyanic acid, for example by reacting ammonia or nitric oxide with methane or other hydrocarbons.

Metals may be used as catalysts in two forms—(a) in the massive state, i. e., by using the metal or alloy in the form of wire gauze, sheets, turnings, etc. and (b) as a supported catalyst. A supported metal catalyst comprises a thin coating of a catalytic metal or alloy on the surface of another material which itself may or may not be catalytic in nature. The catalyst supports used for this purpose are ordinarily non-metallic and more often than not have little or no catalytic activity for the reaction for which the catalyst is used. Porous materials are used as catalyst supports since they offer a larger surface for a given volume of the prepared catalyst. Such materials as kieselguhr, charcoal, silica gel, porcelain shards and the like are commonly used as catalyst supports.

Two important factors in the efficiency of a supported platinum metal catalyst are (a) the uniformity of the metal coating on the support and (b) the adherence of the metal to the support. If the coating is not uniform, the efficiency of the catalyst is usually low; if the adherence of the metal is poor, part of the catalytic metal tends to become disengaged from the support while the catalyst is in use, thus resulting in lowered efficiency, a short catalyst life and often in loss of the precious metal. Poor adherence also, in some cases, causes a relatively low catalytic activity at the start of the reaction.

Supported platinum metal catalysts are commonly prepared by impregnating a porous catalyst support with a compound of the metal and subsequently heating the material to reduce the metal compound to the metal.

An object of this invention is to provide a method for making a supported platinum metal catalyst in which the metal is coated on the surface of the support with a high degree of uniformity and with a high degree of adherence to said surface. A further object is to provide a method of preparing improved platinum metal supported catalysts which have long periods of usefulness and cause improved yields in catalytic processes. My invention also comprises novel types of supported platinum metal catalytic bodies which may be prepared by the herein described method.

The above objects are attained in accordance with my invention by coating or impregnating a suitable refractory supporting material with a platinum metal salt or other decomposable compound of a platinum metal and heating the material to a temperature sufficiently high to decompose the platinum metal compound, said heating being carried out in the presence of a moving stream of a non-reducing gas. One method of practicing my invention comprises first coating or impregnating the catalyst support with a water solution of a platinum metal salt, drying the impregnated material at a relatively low temperature and then heating it to the decomposition temperature while placed in a moving stream of a non-reducing gas. Preferably, the non-reducing gas is passed over the surface of the material at a rate sufficient to carry off the gaseous decomposition products. As non-reducing gas, I may use an inert gas or, in some cases, an oxidizing gas.

I have discovered that by supplying a moving stream of a non-reducing gas to the catalyst material during the decomposition heating step, the adherence of the coating and the uniformity of the coating formed on the catalyst support are improved to a very great degree. On the other hand, I have found that if the same catalytic material is decomposed by the ordinary method, i. e., by merely heating in an open container, or by heating in an atmosphere of a reducing gas, the uniformity of the coating is relatively poor and the coating has relatively poor adherence to the catalyst support, with the result that the catalytic activity of the final preparation is correspondingly low and the life of the catalyst is relatively short. When a reducing gas, such as hydrogen is used, the results are substantially the same, regardless of whether the material is merely heated in a hydrogen atmosphere or whether the hydrogen is supplied as a continuous, rapid stream, passing over the surface of the material during the decomposition step. On the other hand, when a non-reducing gas is used, distinctly better results are obtained when a moving gas stream is utilized; the best results are obtained when the rate of gas flow is sufficiently high to remove the gaseous decomposition products substantially as fast as they are formed.

A further unexpected result obtained from my invention is that it permits the use of non-porous catalyst supports without substantial decrease of the catalytic activity. In fact, when preparing catalysts by my invention, I have obtained at times a higher degree of catalytic activity by using a non-porous support than by using a porous support of the same substance. For example, a catalyst made according to my invention with a vitreous silica support showed a higher degree of catalytic activity than the same metal supported on a silica gel support.

I have tested the catalysts prepared according to my invention by utilizing them as catalytic bodies for the reaction between nitric oxide and hydrocarbon to produce hydrocyanic acid. One method of carrying out this reaction, which is described and claimed in copending U. S. Patent application S. N. 701,361, comprises passing a hot mixture of nitric oxide and a hydrocarbon, preferably with the addition of an inert gas and a small amount of oxygen, over a platinum metal catalyst. A preferred method of carrying out this process comprises first oxidizing ammonia with an excess of air in the presence of a suitable catalyst, for example a platinum metal catalyst, whereby a hot oxidation product which consists mainly of a mixture of nitric oxide, water vapor, nitrogen, and a small amount of oxygen is obtained. This hot, nitric oxide containing gas is mixed with a suitable quantity of a hydrocarbon vapor which may or may not be preheated and the resulting mixture is passed over a platinum metal catalyst. The temperature of the reactive mixture at the time of its initial contact with the metal catalyst is preferably maintained at about 400 to 600° C. Hydrocyanic acid is recovered from the off gases by known means, for example by scrubbing with water and distilling the resultant solution of HCN or by passing the off gases into an alkaline solution whereby an alkali cyanide is formed which subsequently may be recovered.

The following examples illustrate methods of preparing supported platinum metal catalysts in accordance with my invention and show the results obtained by using these catalysts in the above mentioned process for producing hydrocyanic acid.

*Example 1*

Vitreous silica of high purity was crushed and screened to about 10 mesh size. About 20 cc. of this screened silica was impregnated or wet with 5 cc. of aqueous solution of chloroplatinic acid and rhodium chloride containing the equivalent of 106.4 grams of platinum and 26.6 grams of rhodium per liter. The wet silica then was dried by heating in a shallow container on an electric hot plate with constant stirring until dehydration was complete. The dried material then was slowly introduced in small increments into the top of a vertical silica tube of about 25 mm. inside diameter, which was heated in an electric furnace, the material dropping on to a perforated plate at the bottom of the tube. A constant stream of air was forced upward through the silica tube through an opening leading into the space below the perforated plate on to which the catalytic material was dropped. The temperature within the tube, as measured by a thermocouple located near the perforated plate in the lower end of the tube, was varied in the range 500 to 1400° C. The air was introduced at the rate of about 2 liters per minute in some runs and about 200 cc. per minute in other runs. A number of preparations were made in this manner using the 10 mesh vitreous silica gel as catalyst support, while varying the rate of air flow and the temperature maintained in the silica tube and heating the material 2 to 3 hours.

Each sample of catalyst which was produced in this manner was evaluated by using it as a catalyst for the preparation of hydrocyanic acid by the reaction between nitric oxide and methane. The evaluation procedure was as follows:

Ten cc. of the catalyst was supported in a 16 mm. I. D. silica tube on a perforated sillimanite disc and the tube was placed in a vertical position in an electric resistance furnace. A mixture of 500 cc. of nitric oxide, 375 cc. of oxygen, 4000 cc. of nitrogen and 750 cc. of steam per minute was passed downwardly through the silica tube, while the temperature, as recorded just below the catalyst was raised to 700° C. Natural gas (83% CH$_4$) then was added to the mixture at a rate of 800 cc. per minute and the temperature was raised to 1100° C. A series of evaluation runs was then made to determine the optimum amount of natural gas to use in the gas mixture for that particular catalyst. The yield of HCN obtained with the optimum hydrocarbon concentration was taken as the numerical evaluation of the catalyst being tested.

The resultant data are summarized in the following table:

| Catalyst lot | Conditions of catalyst preparation | | Catalyst evaluation | |
|---|---|---|---|---|
| | Decomposition temperature | Rate of air flow | HCN yield based on NH$_3$ used | HCN yield based on CH$_4$ used |
| | | | Percent | Percent |
| A | 500° C | 2000 cc./min | 46.7 | 26.0 |
| B | 800° C | 2000 cc./min | 58.5 | 32.5 |
| C | 1200° C | 2000 cc./min | 62.5 | 31.3 |
| D | 1400° C | 2000 cc./min | 69.4 | 38.6 |
| E | 900° C | 200 cc./min | 53.2 | 29.6 |

A 10 cc. portion of catalyst E which had not been used in the evaluation test was heated in the silica tube in a current of air at 200 cc./min. up to 1200° C. over a period of 1 hour and then evaluated. The evaluation resulted in HCN yields of 60.5% and 27.4%, based on NH$_3$ and CH$_4$ used, respectively.

*Example 2*

Various samples of supported platinum-rhodium catalysts having the same composition as those of Example 1 and supported on 10-mesh vitreous silica were prepared by the method of Example 1 except that various gases were used in place of air during the heating step in some of the runs. In these preparations, the decomposition temperature was maintained at about 1200° C. while the gas used was passed through the silica tubes at the rate of about 200 cc. per minute. The catalyst obtained by these preparations were evaluated according to the method described in Example 1. As a check, the evaluation test was also carried out by using pure vitreous silica without any metallic coating as a catalyst in the hydrocyanic acid synthesis reaction. The results obtained are shown in the following table:

| Run | Catalyst | Gas used for catalyst preparation | Catalyst evaluation | |
|---|---|---|---|---|
| | | | HCN yield based on NO used | HCN yield based on CH₄ used |
| | | | Percent | Percent |
| 1 | Pt-Rh on vitreous SiO₂ | Air | 71.0 | 41.7 |
| 2 | Pt-Rh on vitreous SiO₂ | Nitrogen | 75.0 | 40.0 |
| 3 | Pt-Rh on vitreous SiO₂ | Hydrogen | 15.0 | 9.7 |
| 4 | Pure vitreous SiO₂ | | 20.8 | 11.1 |

The above listed platinum-rhodium supported catalysts were chemically analyzed for total metal content and examined under the microscope. The results are tabulated below:

| No. | Gas used for catalyst preparation | Metal content (percent by wt.) | Appearance |
|---|---|---|---|
| | | Percent | |
| 1 | Air | 6.68 | Grey, dull metallic lustre, well covered. |
| 2 | Nitrogen | 5.32 | Similar to No. 1. |
| 3 | Hydrogen | 4.37 | Naked eye—like grey dusty quartz—coverage poor. Microscope—tiny smooth surface globules easily rubbing off. |

*Example 3*

Two batches of catalysts were prepared according to the method used in Example 1 to make a platinum-rhodium supported catalyst; in one case, vitreous silica was used as the support, while in the other, the support was a purified dehydrated silica gel. The catalysts were evaluated by using the HCN synthesis as described in Example 1. The results obtained are shown in the following tabulation:

| Catalyst support | Catalyst evaluation | |
|---|---|---|
| | HCN yield based on NO used | HCN yield based on CH₄ used |
| | Percent | Percent |
| Vitreous silica | 72.5 | 38.8 |
| Silica gel | 58.2 | 28.3 |

In accordance with my invention, the non-reducing gas, which is passed over the surface of the catalytic material while the platinum metal compound thereon is being heated to its decomposition temperature, should flow at a rate sufficient to carry off at least part of the volatile decomposition products. For this purpose, any substantially non-reducing gas is suitable provided it does not contain substances which will "poison" the catalytic metal and does not react with the particular platinum metal employed, to form volatile compounds. Since the individual platinum metals differ somewhat in their chemical properties, it is sometimes necessary to select the non-reducing gas employed with regard to the particular metal present. However, a chemically inert gas, that is, a gas which is neither an oxidizing gas nor has distinct reducing properties, e. g., nitrogen or argon may be used, regardless of what platinum metals are present. The non-reducing gas should not contain material quantities of chlorine as this element tends to form volatile compounds of the platinum metals at the temperatures employed. Oxygen or air may be satisfactorily employed in the preparation of catalysts in which platinum, palladium, or rhodium predominate. Such oxidizing gases cause some oxidation of these metals, especially rhodium, but the formation of a small amount of oxide does not appear to reduce the catalytic activity. The oxides of these three metals are substantially non-volatile at the temperatures employed in my process. The other three metals of the group of platinum metals, namely, iridium, osmium and ruthenium, react with oxygen to form volatile oxides. The volatility of the iridium oxides is not great at the temperatures employed and therefore appreciable amounts of oxygen may be present in the non-reducing gas employed in making iridium-containing catalysts by my method. I prefer, however, to avoid the presence of oxygen when the catalyst is to contain a large proportion of iridium. If the catalyst is to contain osmium and/or ruthenium in predominating proportions, the presence of oxygen in the non-reducing gas should be avoided; although small amounts, e. g., 2–3% of oxygen may be tolerated, I prefer to use a substantially oxygen-free gas in making osmium and/or ruthenium catalysts by my invention.

My invention is not restricted to the method of flowing the non-reducing gas over the surface of the catalyst material during the step of decomposing the platinum metal compound, which is described above by way of illustration. For example, I have found that substantially the same effect can be obtained by heating the material in an open crucible, provided a certain procedure is followed. As an example of this crucible method of practicing my invention, I may place granular catalyst supporting material in a crucible open to the air and heat it to the platinum metal compound decomposition temperature, e. g. 1000 to 1400° C. While maintaining the material at this temperature, I pour into the crucible a solution of a suitable platinum metal compound, e. g., chloroplatinic acid, at a slow rate, e. g., drop by drop, or in a fine spray, taking care that the solution does not penetrate below a relatively thin top layer of the supporting material. The consequent evolution of steam causes an air circulation over this top layer of material, resulting in a flow of air and steam over the surface of the material which is contacted with the solution. I then stir the contents of the crucible to bring uncoated material to the top and repeat the operation, until all particles of support material have been coated. Preferably, this operation may be conducted in a relatively shallow crucible and if desired, a blast of air or other non-reducing gas may be blown across the surface of the material. Gases which have a substantial reducing effect, for example, hydrogen, hydrocarbons or various other organic vapors which have distinct reducing properties, are unsuitable for practicing my invention.

The temperature at which the catalytic material is exposed for the purpose of decomposing the platinum metal compound or compounds to produce the metallic coating on the support may vary between wide limits. Obviously, the minimum temperature is that required for causing the decomposition to occur in a reasonable time. The optimum temperature used in any particular case will depend not only upon the decomposition temperature of the particular platinum metal compound or compounds used but also may depend upon the nature of the reaction for which the material is to be used as catalyst. In most cases, it will be found necessary to heat the material to at least 500° C. to effect the decomposition; I prefer to carry out the decomposition reaction at temperatures of 1000 to 1400° C.

An advantage of my herein described method of preparing supported platinum metal catalysts resides chiefly in the fact that the uniformity of the catalytic metal coating on the support and the degree of adherence of the metal to the support are extremely high and are much greater than it is possible to obtain by prior methods. The improved nature of the catalysts prepared by my method results in greater initial catalytic activity and longer catalyst life, thus producing higher yields of products and decreasing the cost of carrying out catalytic processes. A further advantage of my invention is that it permits the use of non-porous catalytic supports without decreasing catalytic activity. It is often advantageous for a number of reasons to use a non-porous support rather than a porous one. For example, the crushing strength of a non-porous support is usually greater than that of a porous support made of the same substance; e. g., vitreous silica particles are stronger and less liable to disintegration than silica gel. Also it is often more convenient and less expensive to use a non-porous support than a porous one, due to the special procedures required to produce the required degree of porosity.

I claim:

1. A process for preparing a supported platinum metal catalyst comprising coating the surface of a supporting material comprising silica with a reducible compound of a platinum metal and subsequently heating the material to a temperature sufficient to thermally decompose the platinum metal compound, while simultaneously flowing over the surface of said material a non-reducing gas which does not react with said platinum metal to form volatile metal compounds, at a rate of flow sufficient to remove gaseous decomposition products.

2. A process for preparing a supported platinum metal catalyst comprising coating the surface of vitreous silica with a reducible compound of a platinum metal and subsequently heating the material to a temperature sufficient to thermally decompose the platinum metal compound, while simultaneously flowing over the surface of said material a non-reducing gas which does not react with said platinum metal to form volatile metal compounds, at a rate of flow sufficient to remove gaseous decomposition products.

3. A process for preparing a supported platinum metal catalyst comprising coating the surface of a refractory supporting material with a reducible compound of platinum and subsequently heating the material to a temperature sufficient to thermally decompose the platinum metal compound, while simultaneously flowing a stream of a non-reducing gas over the surface of said material at a rate sufficient to remove gaseous decomposition products.

4. A process for preparing a supported platinum metal catalyst comprising coating the surface of a supporting material comprising silica with reducible compounds of platinum and rhodium and subsequently heating the material to a temperature which is above the decomposition temperature of said reducible compounds but not lower than about 500° C., while simultaneously flowing a stream of a non-reducing gas selected from the group comprising oxygen, nitrogen and oxygen-nitrogen mixtures over the surface of said material at a rate sufficient to remove gaseous decomposition products.

5. A process for preparing a supported platinum metal catalyst comprising coating the surface of vitreous silica with reducible compounds of platinum and rhodium and subsequently heating the material to a temperature of 1100° to 1400° C., while simultaneously flowing a stream of air over the surface of said material at a rate sufficient to remove gaseous decomposition products.

6. A process for preparing a supported platinum metal catalyst comprising coating the surface of dehydrated silica gel with a reducible compound of platinum and subsequently heating the material to a temperature which is above the decomposition temperature of said reducible compound but not lower than about 500° C., while simultaneously flowing a stream of a non-reducing gas selected from the group comprising oxygen, nitrogen and oxygen-nitrogen mixtures over the surface of said material at a rate sufficient to remove gaseous decomposition products.

7. A process for preparing a supported platinum metal catalyst comprising wetting the surface of a catalyst support with a solution of a reducible compound of a platinum metal and subsequently heating said material to a temperature sufficient to thermally decompose the platinum metal compound, while simultaneously flowing over the surface of said material a non-reducing gas which does not react with said platinum metal to form volatile metal compounds, at a rate of flow sufficient to remove gaseous decomposition products.

8. A process for preparing a supported platinum metal catalyst comprising wetting the surface of a supporting material comprising silica with a solution of a reducible compound of platinum and subsequently heating the material to a temperature which is above the decomposition temperature of said reducible compound but not lower than about 500° C., while simultaneously flowing a stream of a non-reducing gas selected from the group comprising oxygen, nitrogen and an oxygen-nitrogen mixture over the surface of said material at a rate sufficient to remove gaseous decomposition products.

9. A catalyst body comprising a catalyst support, the surface of which is substantially uniformly coated with a platinum metal and characterized by a high degree of adherence between the said metal and said support, said catalyst body having been prepared by thermally decomposing a compound of said metal coated on said support in the presence of a flowing stream of a non-reducing gas.

10. A catalyst body comprising a catalyst support, the surface of which is substantially uniformly coated with platinum and characterized by a high degree of adherence between the said metal and said support, said catalyst body having been prepared by thermally decomposing a compound of said metal coated on said support in the presence of a flowing stream of a non-reducing gas.

11. A catalyst body comprising particles of vitreous silica, the surface of which is substantially uniformly coated with platinum and rhodium and characterized by a high degree of adherence between the said metals and the said support, said catalyst body having been prepared by thermally decomposing compounds of said metals coated on said support in the presence of a flowing stream of a gas selected from the group comprising oxygen, nitrogen, and an oxygen-nitrogen mixture.

CHARLES ROBERTS HARRIS.